June 24, 1930.  W. C. BRUTON  1,766,327
CAN MANGLING MACHINE
Filed Dec. 17, 1927
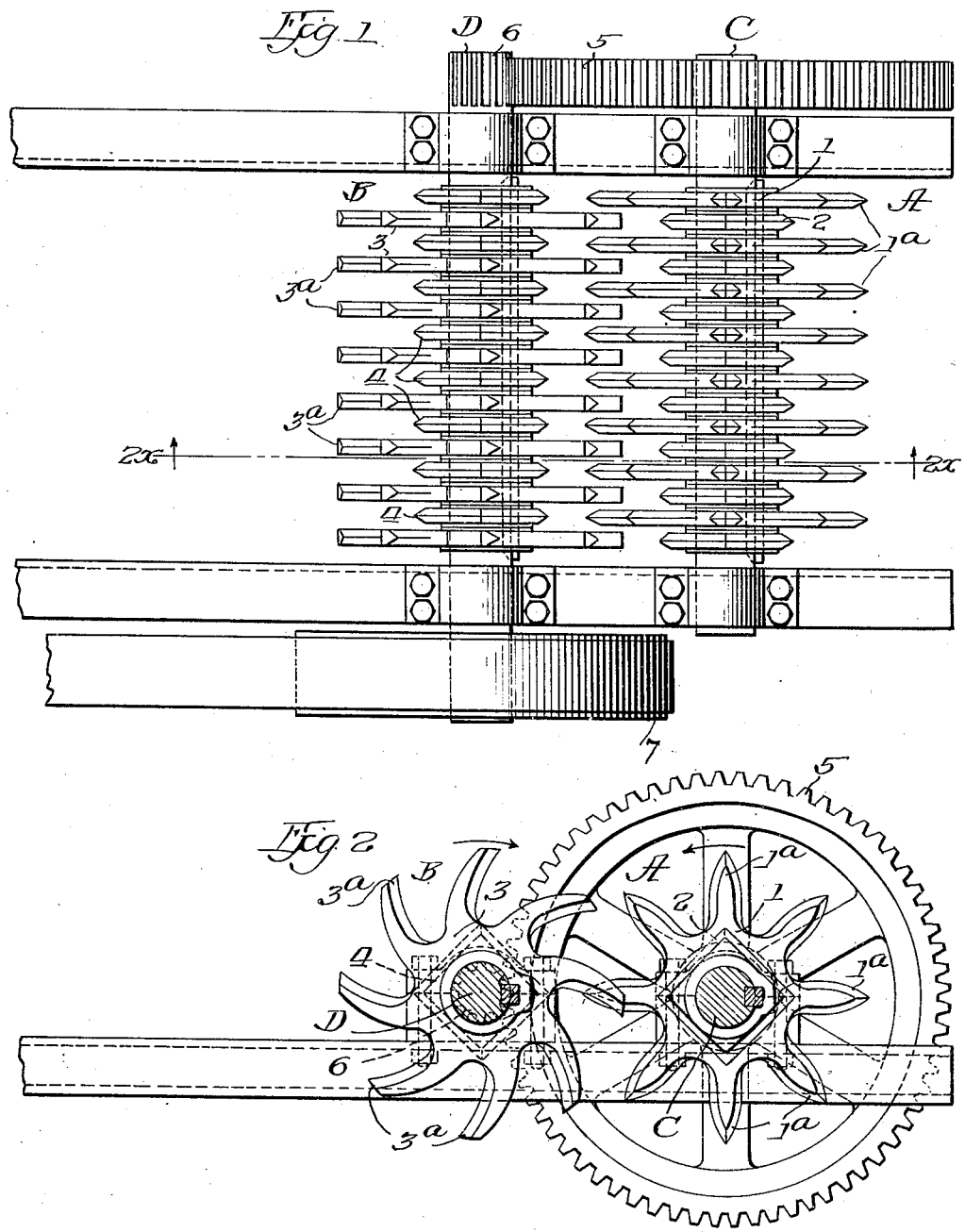

Patented June 24, 1930

1,766,327

UNITED STATES PATENT OFFICE

WILLIAM CHARLTON BRUTON, OF ALBANY, CALIFORNIA, ASSIGNOR TO AMERICAN MANGANESE STEEL COMPANY, OF CHICAGO, ILLINOIS, A CORPORATION OF MAINE

CAN-MANGLING MACHINE

Application filed December 17, 1927. Serial No. 240,716.

This invention relates to machines used for mangling metal cans in the process of making the cans more useful for salvaging purposes, such as detinning the metal and bundling the scrap to put it in convenient form for remelting; and in which said procedure it is important to reduce the metal of the cans to such physical form as will insure complete drainage from the cut-up scrap and avoid waste of the reagent for reducing the tin of the surface (for instance, muriatic acid used to convert the tin into stannous chloride).

It has been customary heretofore to use star shaped and other impaling and cutting wheels cooperating in pairs to draw the cans in between them and reduce them to pieces of scrap, but such machines have not operated with fullest efficiency because of defects in the designing of cutters.

The object of the present invention is to provide a cutter that will act much more efficiently in the reduction of cans to pieces of scrap and which will at the same time improve the feed of the cans through the machine; the new design of cutter being particularly adapted to take the place of one gang of cutters in the pair of cutter gangs heretofore used, and to coact with the retained gang of cutters of known design in a manner to produce a new result by the coaction of the new cutter and the old cutter, in addition to the superior effect of the new cutter per se.

The invention proceeds upon the principle of providing a rotating gang of cutters of any suitable form which will assist in feeding the cans through the machine and holding them in position to be acted upon, but preferably having a series of teeth or blades which impale, cut, and hold the cans while rotating at a predetermined speed, and combining therewith a more rapidly moving rotary slicer having a circumferential series of blades projecting outwardly toward and into cooperating relationship with the feeding and holding gang; the slicing blades being formed with cutting edges inclined outwardly in the direction of rotation, forwardly from their bases, or, in other words, inclined inwardly and rearwardly from radii of the cutter which meet the outer points of the blades so that in executing a relative movement to the can several novel effects will be produced, included among which, regarding each individual cutting tooth of the new form of cutter, are the approximate endwise movement of the blade into the can at the point of first contact; the shearing cut resulting from the combined longitudinal and transverse movement of the cutting edge as the blade passes through the can; the displacement of the can radially inward upon the impaling blades of the feeding gang at the beginning of the cutting operation; the movement of the cutting edge substantially transverse to the coacting impaling blade occupying the intermediate portion of the cutting action; and the drawing of the scrap away from the impaling tooth during the latter part of the cutting action. Preferably the members which make up the impaling, holding, and feeding gang on the one hand and those which make up the more rapidly driven cutting gang are in planes alternating in position so that the members of one gang may lap those of the other gang. Moreover, in addition to the said members of the two gangs, and which may be distinguished as primary blades or knives, each gang has in intermediate spaces secondary cutters of reduced diameter and of special design, for instance, with four edges forming substantially a square, and the secondary cutters of one gang are preferably in the same plane with the primary cutters, blades, or knives of the other gang.

In the accompanying drawing, in which the preferred embodiment of the invention is shown by way of illustration,—

Figure 1 is a plan view of two coacting gangs of cutters of a can mangling machine embodying the present invention, and including sufficient of the mounting frame and driving mechanism to illustrate the cooperative relationship of the cutters in use.

Figure 2 is a side elevation of parts shown in Figure 1.

A and B represent two gangs of cutters. The gang A consists of primary cutters 1 designed to provide substantially radial cutting and impaling teeth 1ª, and secondary cutters 2 of relatively smaller diameter than the cutters 1 having edges presented as the sides of a square and located intermediately of said cutters 1. The gang B comprises cutters 3 having knife blades 3ª of a design which causes said cutters to coact with especially advantageous effect with the cutters of the gang A; said blades 3ª having their forward surfaces reduced to cutting edges which curve outwardly and, with respect to the direction of rotation, forwardly from their bases where they unite with the bodies of the blades so as to develop a hooking effect, exercise a shearing cut upon the metal of the can, and coact peculiarly with cutting teeth 1ª of the gang A in that they develop an impaling thrust as they approach said teeth, but exercise a splashing cut transversely of the teeth as they pass in overlapped relation thereto, and exercising a hooking and disimpaling effect as each blade separates from a coacting tooth. Gang B further comprises secondary cutters 4 alternated in position with the primary cutters 3 so as to be in substantially the same planes with the primary cutters 1 of the gang A, and these secondary cutters 4 are preferably designed to present their cutting edges as sides of a square.

The two gangs are rotated in opposite directions so that their contiguous sides both move downwardly and automatically drag in between them cans deposited over them. The gang B, in which the cutters are formed with hooked knife blades, moves more rapidly than and may be driven, advantageously, as rapidly as eight times the speed of the gang A, and the effect is to so impale the cans on the cutting teeth 1ª of the gang A that the cans, while receiving numerous incisions by the act of impalement, will be carried around at such a retarded speed relatively to that of the cutters 3, that the latter while assisting in the impalement of the cans, will slice them with shearing cuts, especially while the cans are prevented from disimpalement in passing the horizontal diameter of the cutters; and in so far as there is any engagement of the material of the can by a cutter as the impaling teeth and knife blades recede on the under side, such engagement will be favorable to disimpalement of the scrap from the impaling teeth. In other words, the machine becomes self clearing by the use of the new form of cutter in combination with the old form. As there will be considerable force exerted by the teeth and blades upon the material being cut, in a direction which tends to force the latter into the hubs of the cutters, the secondary cutters 2 and 4 will add their mangling effect to that of the other elements, and when the cans emerge they will be so mangled and reduced to pieces as will make them suitable for treatment in a liquid without trapping of air that would exclude liquid from any portion of the surface of the scrap, and without trapping liquid in cavities of scrap that would prevent its release in drainage; moreover, the scrap will be in suitable form for introduction into the press, in reducing the scrap to bundles of proper dimensions to enter the charging box for remelting purposes.

Any suitable driving means may be employed for establishing rotation of the cutter gangs A and B at desired relative speeds. The means illustrated for this purpose consist of the large gear wheel 5 on the shaft C of the gang A, the small pinion 6 on the shaft D of the gang B developing with said gear wheel 5 a speed reduction of from 8 to 1, and the drive pulley 7 on the opposite end of the shaft D receiving a belt 8 from any suitable source of power.

The speed of the impaling and cutting teeth in the gang A, by reason of the relative dimensions of the gear wheel 5 and pinion 6, is very much less than that of the cutting knives in the gang B, so that the gang A, once the sheet metal objects are impaled upon its teeth, serves to hold back the objects or retard their feed through the machine while they are being sliced by the knives. The presentation of the cutting edges of the blades 3ª wih reference to the impaling teeth 1ª, and especially when the cutting blades are traveling more rapidly than the impaling teeth, causes the sheet metal objects to be forced endwise inwardly of the impaling teeth as the teeth and blades approach the place of overlapping, since the knives are caused, by the means upon which they are mounted, to move in a path having a component which is at that time lonigtudinal to and inward of the teeth; and through the same means the knives travel substantially transversely to the impaling teeth at the place of overlapping, thereby raising the slicing efficiency, and longitudinally to and outwardly of the teeth as the teeth and knives separate or leave the place of overlapping, thereby producing a stripping effect.

I claim:

1. In a can mangling machine, a rotatably mounted shaft having a multiplicity of teeth projecting substantially radially from said shaft, and a second shaft rotatably mounted near the first shaft and having a multiplicity of cutter blades projecting therefrom and intermeshing with the teeth of the first shaft; said cutter blades being curved in the direction of rotation of said second shaft.

2. In a can mangling machine, a rotatably mounted shaft having a multiplicity of teeth projecting substantially radially from said shaft, and a second shaft rotatably mounted near the first shaft and having a multiplicity of cutter blades projecting therefrom and intermeshing with the teeth of the first shaft; said cutter blades being curved in the direction of rotation of said second shaft; means for driving the shaft first named to cause the teeth projecting therefrom to travel at one rate of speed, and means for driving the second shaft at a rate that causes the cutter blades to travel at a materially greater speed than the teeth.

3. In a sheet metal mangling machine, in combination, a plurality of series of radially presented impaling and feeding teeth; a plurality of series of cutting knives, said teeth and knives being arranged in alternating planes and having longitudinal dimensions which cause them to laterally overlap; means for mounting and imparting a relatively slow rotary movement to said teeth; and means for mounting and imparting a relatively faster rotary movement to said knives; said knives having cutting edges inclined forwardly in their direction of movement, whereby their mounting means directs them in a path having a component which is radially inward with respect to the teeth, as the teeth and knives approach the place of overlapping.

4. In a machine for mangling sheet metal objects, in combination, a rotary gang of teeth for impaling the objects and retarding their passage through the machine; means for driving said gang of teeth at a relatively slow speed; a cooperating gang of rotary cutters having forwardly presented cutting edges and moving into laterally overlapping relation with said teeth; means for driving said cutters at a faster speed than said teeth, thereby causing the cutting edges of said cutters to travel in a path which extends longitudinally to and inwardly of the impaling teeth as said teeth and cutters approach the place of overlapping, thence transversely to said teeth while at the place of overlapping, and thence longitudinally to and outwardly of the teeth as the teeth and cutters leave the place of overlapping.

5. In a can mangling machine, a revolving gang of impaling teeth arranged in a plurality of annular series in spaced planes; a revolving gang of slicing cutters arranged in a plurality of annular series in planes alternating in position with the several planes in which said teeth are arranged, said impaling teeth and slicing cutters having radial dimensions which cause them to laterally overlap; secondary cutters alternating in positions with the several series of impaling teeth and in approximately the same planes with the slicing cutters, but having radial dimensions which cause them to travel in a path that is radially beyond the ends of said slicing cutters; and secondary cutters alternating in position with the several series of slicing cutters in substantially the same planes with the impaling teeth, but having radial dimensions which cause them to travel in paths beyond the ends of said impaling teeth.

Signed at Oakland, California, this 28th day of November, 1927.

WILLIAM CHARLTON BRUTON.